(12) United States Patent
Yamauchi

(10) Patent No.: US 6,278,943 B1
(45) Date of Patent: Aug. 21, 2001

(54) VEHICLE SYSTEM FOR TRAVEL GUIDANCE OF INTERSECTIONS

(75) Inventor: Hideaki Yamauchi, Nishikasugai-gun (JP)

(73) Assignee: Denso Corp., Kariya (JP)

( * ) Notice: Subject to any disclaimer, the term of this patent is extended or adjusted under 35 U.S.C. 154(b) by 0 days.

(21) Appl. No.: 09/522,079

(22) Filed: Mar. 9, 2000

(30) Foreign Application Priority Data

Mar. 12, 1999 (JP) .................................................. 11-066811

(51) Int. Cl.[7] ...................................................... G06G 7/78
(52) U.S. Cl. ............................ 701/211; 701/201; 340/988
(58) Field of Search ..................................... 701/200, 201, 701/202, 207, 209, 210, 211, 23, 25, 26; 340/988, 990, 995; 73/178 R

(56) References Cited

U.S. PATENT DOCUMENTS

| | | | |
|---|---|---|---|
| 4,763,270 | * 8/1988 | Itoh et al. | 701/209 |
| 4,882,696 | 11/1989 | Nimura et al. | 701/207 |
| 5,398,189 | * 3/1995 | Inoue et al. | 701/208 |
| 5,774,071 | 6/1998 | Konishi et al. | 340/988 |
| 5,893,045 | * 4/1999 | Kusama et al. | 701/211 |
| 6,018,697 | * 1/2000 | Morimoto et al. | 701/209 |

FOREIGN PATENT DOCUMENTS 63-211499   9/1988   (JP) .
09-119840   5/1997   (JP) .

* cited by examiner

Primary Examiner—William A. Cuchlinski, Jr.
Assistant Examiner—Yonel Beaulieu
(74) Attorney, Agent, or Firm—Law Office of David G. Posz

(57) ABSTRACT

A vehicle navigation system performs regular travel guidance with respect to a guidance target intersection at a specific distance short of the intersection. When a distance between first and second guidance target intersections is shorter than the specific distance, regular travel guidance with respect to the second guidance target intersection is not performed. In this case, the vehicle navigation system performs supplementary travel guidance with respect to the second guidance target intersection immediately after passing through the first guidance target intersection. Accordingly, travel guidance can always be performed with respect to an immediate guidance target intersection.

20 Claims, 8 Drawing Sheets

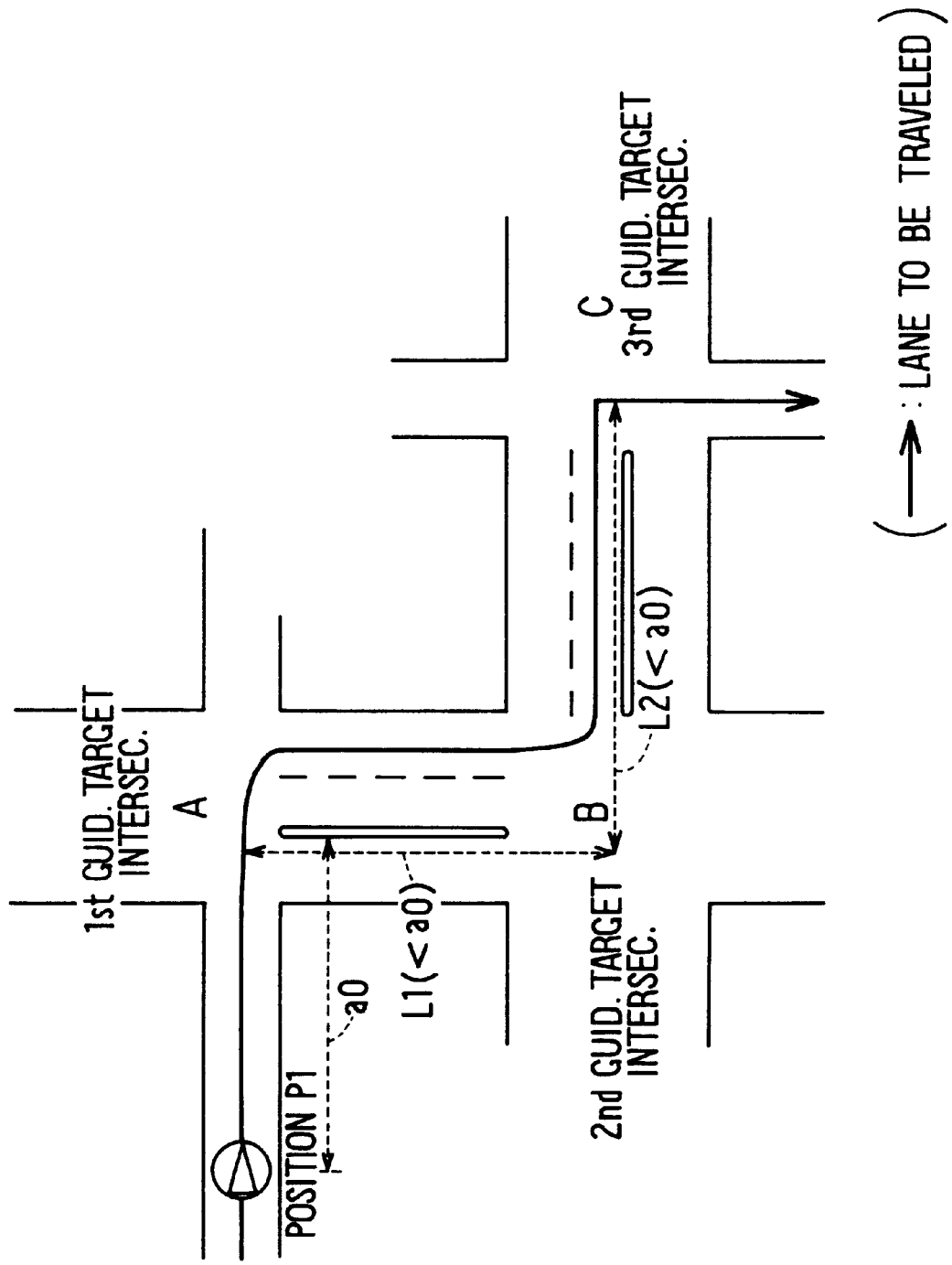

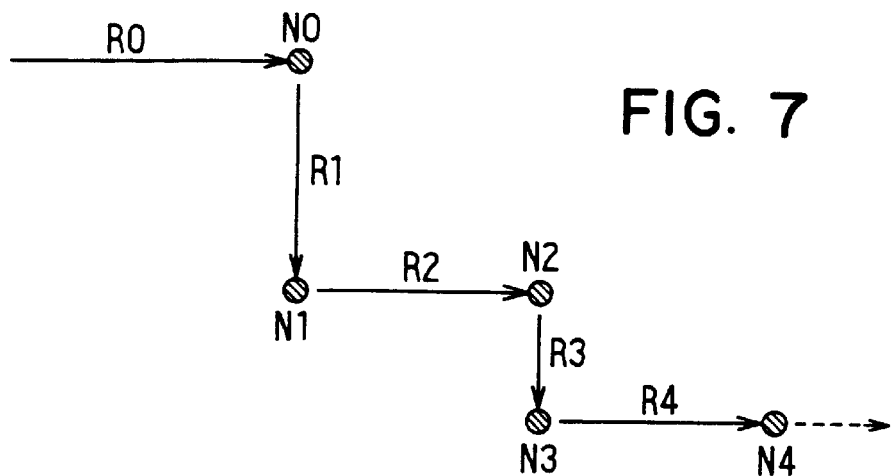
FIG. 7
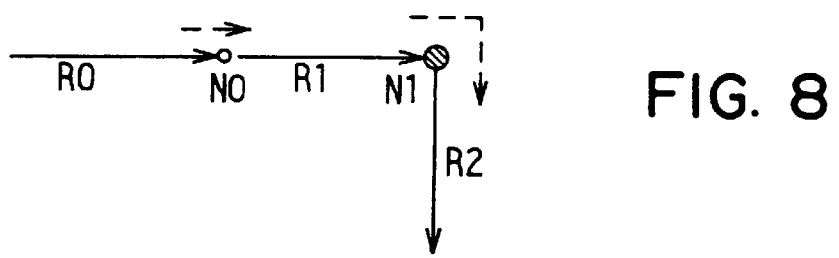
FIG. 8
FIG. 9
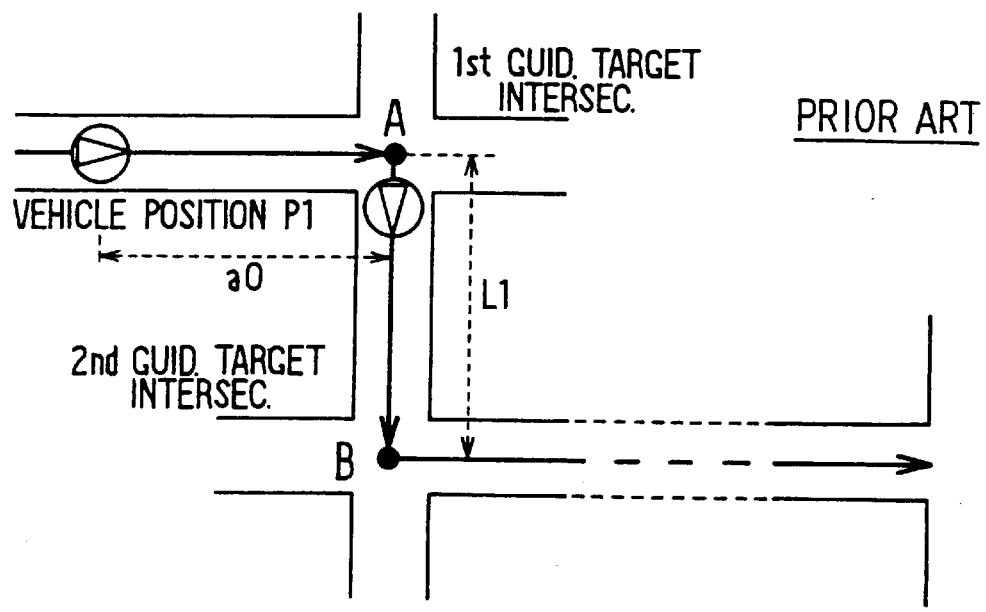
PRIOR ART

US 6,278,943 B1

VEHICLE SYSTEM FOR TRAVEL GUIDANCE OF INTERSECTIONS

CROSS REFERENCE TO RELATED APPLICATION

This application is based upon and claims the benefit of Japanese Patent Applications No. 11-66811 filed on Mar. 12, 1999, the contents of which are incorporated herein by reference.

BACKGROUND OF THE INVENTION

1. Field of the Invention

This invention relates to a vehicle navigation system for performing travel guidance with respect to an intersection when a vehicle approaches the intersection on a destination route set for navigating the vehicle to a destination.

2. Description of the Related Art

Vehicle navigation systems for navigating a vehicle to a destination smoothly by displaying a present position of the vehicle, which is detected by a GPA or the like, together with a road map are widely known. Further, vehicle navigation systems for navigating a vehicle to a destination by setting and utilizing an appropriate route (destination route) from a present position to the destination are widely known. These navigation systems contribute to smooth drives of the vehicles.

One type of these navigation systems issues vocal travel guidance for an intersection (guidance target intersection) to a user (driver) on the route every when a vehicle approaches the guidance target intersection. For instance, the navigation system issues vocal travel guidance for teaching a distance from the present position to the guidance target intersection and a direction to turn at the intersection in a manner such as that "Please travel straight ○○ meters and turn right". Further, the navigation system can teach a name of the guidance target intersection in vocal sounds.

In this case, the timing (regular guidance timing) for performing the travel guidance is when the vehicle reaches a position having a specific distance from the guidance target intersection, and the specific distance is set in accordance with a type of road on which the vehicle travels. There is a case where vocal travel guidance is performed more than one time for one guidance target intersection. However, herebelow considered is a regular guidance timing (minimum regular guidance timing) for performing vocal travel guidance for the intersection latest. When a distance between two guidance target intersections is sufficiently long, the minimum regular guidance timing occurs inevitably. However, there is a case where the distance between two guidance target intersections is so short that the minimum regular guidance timing does not occur.

A conventional method to comply with such a case is explained below with reference to FIG. 9. It is assumed that a minimum regular guidance timing for a first guidance target intersection A is set to a time when a vehicle reaches a vehicle position P1 having a specific distance a0 from the first guidance target intersection A. In this case, usually, travel guidance is performed at the vehicle position P1 only for the first guidance target intersection A in a manner such as that "Please turn right". However, in a situation shown in FIG. 9, a distance L2 between the first guidance target intersection A and a second guidance target intersection B is shorter than the specific distance a0. The specific distance a0 also determines the minimum regular guidance timing for the intersection B. In this case, the travel guidance for the intersection B cannot be performed on the rout between the two intersections A and B.

Therefore, the travel guidance for the intersection B is performed together with the travel guidance for the intersection A at the vehicle position P1 in a manner such as that "Please turn right at the intersection A, and turn left at the next intersection B". When the situation where a distance between adjacent two guidance target intersections is shorter than the specific distance a0 continues from the first, second, third, . . . , to n guidance target intersections, the travel guidance may be performed for the first to n guidance target intersections simultaneously at the minimum regular guidance timing for the first guidance target intersection A.

For instance, when a road has two lanes after passing through the first guidance target intersection A as shown in FIG. 10, the user (driver) can make a decision by the travel guidance performed as above to enter the left side lane as indicated by line V1 immediately after passing through the intersection A or to change the lane from the right side to the left side as indicated by line V2. Accordingly, the vehicle can turn left at the intersection B smoothly.

However, the driver may miss hearing or forget the travel guidance for the second guidance target intersection B, because it is performed before passing through the first guidance target intersection A. If not only the distance L1 but also a distance L2 (see FIG. 10) between the second guidance target intersection B and a third guidance target intersection C is shorter than the distance a0, the travel guidance must be performed at the vehicle position P1 with respect to the first to third guidance target intersections A, B, and C. In this case, the driver is liable to miss hearing or forget the travel guidance more readily. To avoid this problem, it is important for the driver to hear the travel guidance immediately before passing through the intersection. In the conventional navigation system, there is a case where travel guidance is performed for three or more guidance target intersections simultaneously. In this case, the above problem becomes serious.

SUMMARY OF THE INVENTION

The present invention has been made in view of the above problem. An object of the present invention is to provide a vehicle navigation system for performing travel guidance with respect to an immediate guidance target intersection.

Briefly, a navigation system according to the present invention determines whether a first distance between first and second guidance target intersections is shorter than a specific distance for generating a regular guidance timing, when a vehicle travels between the first and second guidance target intersections. When the first distance is shorter than the specific distance, the navigation system performs supplementary travel guidance at a supplementary guidance timing with respect to the second guidance target intersection before the vehicle passes through the second guidance target intersection. As a result, the travel guidance can always be performed with respect to an immediate guidance target intersection. Preferably, the supplementary travel guidance is performed immediately after passing through the first guidance target intersection.

BRIEF DESCRIPTION OF THE DRAWINGS

Other objects and features of the present invention will become more readily apparent from a better understanding of the preferred embodiments described below with reference to the following drawings, in which;

FIG. 2 is an explanatory view for explaining supplementary travel guidance with respect to guidance target intersections;

FIG. 7 is a schematic view showing links and nodes constituting a travel route;

FIG. 8 is a schematic view for explaining a manner which determines whether a vehicle passes through a guide target intersection or not;

FIG. 9 is an explanatory view for explaining a conventional method for performing travel guidance when a distance between two guidance target intersections is short.

DETAILED DESCRIPTION OF THE PREFERRED EMBODIMENT

Figure 1:
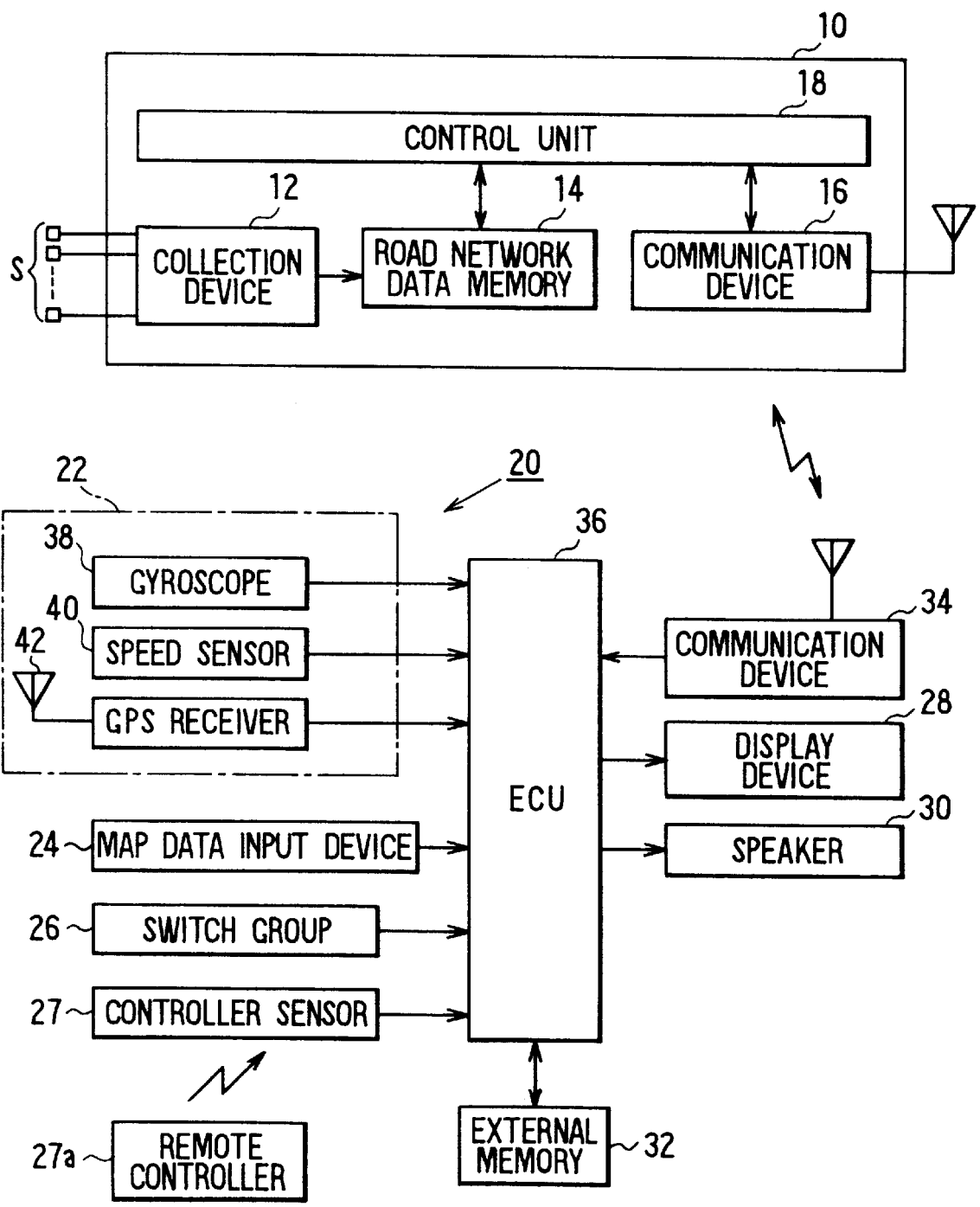
FIG. 1 is a block diagram showing a vehicle navigation system in a preferred embodiment of the present invention.

Referring first to FIG. 1, a vehicular navigation system is denoted with reference numeral 20. The navigation system 20 includes a position detector 22, a map data input device 24, an operation switch group 26, a remote controller sensor 27, a display device 28, a speaker 30, an external memory 32, a communication device 34, and an electronic control unit (ECU) 36.

The position detector 22 has a gyroscope 38, a vehicle speed sensor 40, and a GPS receiver 42 which detects vehicle positions based on radio signals from satellites. Those devices 38, 40 and 42 are used in combined form to compensate for errors which each device has. The devices may be limited to only one, or additional devices such as a terrestrial magnetism sensor, a steering angle sensor or vehicle wheel speed sensors may be used.

The map data input device 24 inputs road map data stored in a record medium. The map data includes road connection data, map matching data for improving accuracy of position detection, and the like. The record medium may be a CD-ROM, a DVD, a memory card, or the like.

The operation switch group 26 includes various switches which instruct operation of the navigation system 20. Specifically it includes a switch for switching a display content on the display device 28, a switch for setting a route to a destination (destination route) by a driver (user). The switches may be a mechanical-type or a touch sensor-type integrated with the display device 28. The remote controller sensor 27 is provided for receiving signals form a remote controller 27a having various switches through which a driver (user) inputs various commands. The remote controller 27a enables drivers to input the same commands therethrough in the same manner as through the switch group.

The display device 28 displays the map data inputted by the map data input device 24, a present vehicle position mark detected by the position detector 22, a vehicle travel destination mark, a recommended travel route from the present position to the destination, and the like. The present position mark, the destination mark and the recommended travel route are displayed on a road map.

The speaker 30 issues travel guidance in vocal sounds in addition to the visual indication by the display device 28. For instance, when a right turn is to be instructed at the next intersection, the speaker 30 announces "Please make a right turn at the next intersection". Accordingly, the driver can recognize information by the vocal announcement without changing his view point.

The communication device 34 receives information from an information station 10 for a vehicle information and communication system (VICS) and transmits information to external sites. The information received from the external sites through the communication device 34 are processed in the electronic control unit 36. The communication device 34 may be a customized receiver or a mobile communication device such as a car phone or a cellular phone.

The electronic control unit 36 is a microcomputer which has a CPU, a ROM, a RAM, an I/O, bus-lines for connection, and the like. The control unit 36 processes signals applied from the position detector 22, the map data input device 24, the switch group 26, the remote controller sensor 27 and the communication device 34 to determine the recommended travel route, and to control the display device 28, the speaker 30, and the communication device 34. The determined recommended travel route is stored in the external memory 32, which is backed up by a battery (not shown).

The information station 10 includes an external condition collection device 12, a road network data memory 14, a communication device 16, and a control unit 18. The information collection device 12 collects external conditions such as road conditions detected by various sensors S provided along roadsides. The network data memory 14 stores various traffic information compiled from various traffic regulations and the external conditions collected by the information collection device 12 as well as a road map in a center area. The communication device 16 communicates with the navigation system 20 through a wireless device such as a car phone, a cellular phone or the like. The control unit 18 specifies roads, which are under traffic regulations or in traffic congestion, from the position data (present position and destination) received from the navigation system 20 and the information stored in the road network data memory 14. The control unit 18 transmits the information to the navigation system 20 through the communication device 16.

In the navigation system 20 having the constitution described above, when a driver inputs a destination of a vehicle through manipulation of the operation switch group 26, the control unit 36 automatically determines the recommended travel route from the present position to the destination. Then, the control unit 36 indicates the travel route on the display device 28 visually and through the speaker 30 in vocal sounds.

Specifically, the control unit 36 determines the travel route in the following manner. When the driver inputs the destination on the road map displayed on the display device 28, the control unit 36 determines the present position of the vehicle based on the satellite data received from the GPS receiver 42. The control unit 36 then determines the shortest travel route from the present position to the destination as the recommended travel route by performing a cost calculation using the Dijakstra's algorism.

The travel route calculation by the Dijakstra's algorism is carried out in the following manner. Referring to FIG. 7, for instance, the travel route is composed of route links Rx (R0, R1, R2, R3, R4, . . . ) and route nodes Nx (N0, N1, N2, N3, N4, . . . ). In the route calculation by the Dijakstra's algorism, costs (evaluation values) of travel routes from the present position to each node are calculated by using the link information of a link between nodes and connection information including traffic regulations. After all route costs are calculated, the links providing the minimum total route cost are connected as a recommended travel route. For instance, the route cost calculation by the Dijakstra's algorism for each link is carried out using a formula of "route cost=link length×road width coefficient×road type coefficient× congestion rate".

The road width coefficient is determined in accordance with a road width. The road type coefficient is determined in accordance with a road type such as a turnpike road. The congestion rate is determined in accordance with a degree of congestion with an initial value of 1. That is, when there is no congestion, the congestion rate is set at 1 not to affect the route cost calculation. As the degree of congestion increases, the congestion rate is increased.

Then, the display device 28 displays the determined recommended travel route on the road map to guide the appropriate route to the driver. This guidance includes intersection guidance, which is carried out every when the vehicle approaches a guidance target intersection on the travel route to indicate how to pass through the intersection. The guidance target intersection means an intersection which is determined by ambient conditions such as a road form that it requires travel guidance therefor. All intersections through which the vehicle is to travel on the route doe not correspond to guidance target intersection. For instance, when the vehicle passes through an intersection while just following a road, the intersection does not correspond to the guidance target intersection.

The intersection guidance in the present embodiment is classified into two type of guidance. One type is travel guidance at a regular guidance timing, and the other type is travel guidance at a supplementary guidance timing. These types of guidance are explained below in sequence.

(I) Travel Guidance at Regular Guidance Timing

A regular guidance a timing means timing when a distance from the present position of the vehicle to a guidance target intersection is a specific value and is set in accordance with types of roads. For instance, the regular guidance timing on expressways is set to be longer than that on city or town roads. As a width of a road increases, the regular guidance timing on the road is increased relatively. However, the guidance timing on a road regulated at a low vehicle speed is relatively short even when the road has a wide width. This is because the travel guidance for a guidance target intersection should be carried out when the vehicle reaches a position having a moderate distance from the intersection. For instance, a position for guidance on expressways is set to approximately 500 m short of a guidance target intersection, and a position for guidance on city or town roads is set to approximately 100 m short of a guidance target intersection.

The travel guidance may be carried out several times with respect to the same guidance target intersection. For instance, the travel guidance may be carried out on an expressway three times 2 Km, 1 Km, and 500 m short of the expressway, and the travel guidance may be carried out on a city or town road three times 700 m, 300 m, and 100 m short of a travel guide intersection.

In this case, the first and second guidance indicates a distance to the intersection and a direction to turn at the intersection in vocal sounds in a manner such as that "Please turn right after travelling ○○ meters". At the minimum regular guidance timing (in the example described above, 500 m short of the intersection on the expressway, and 100 m short of the intersection of the city or town road), only the direction to turn is instructed in a manner such as that "Please turn right soon". No travel guidance is carried out after the minimum regular guidance timing. These travel guidance issued in vocal sounds is very convenient to the driver to grasp the relation between the present position and the guidance target intersection and the like.

(II) Travel Guidance at Supplementary Guidance Timing

A supplementary guidance timing is generated only when the regular guidance timing described above does not occur. For instance, there is a case where a distance between two guidance target intersections is so short that the regular guidance timing does not occur. In the example for the city or town roads described above, the minimum regular guidance timing occurs 100 m short of a guidance target intersection. Therefore, when the distance between two guidance target intersection is shorter than 100 m, the regular guidance timing does not occur.

Therefore, when it is determined that a distance Ln between an n guidance target intersection and an (n+1) guidance target intersection is shorter than a distance a0 for generating a regular guidance timing, a guidance timing is complementally generated after passing through the n guidance target intersection to perform travel guidance for the (n+1) guidance target intersection. The travel guidance may be performed not only for the (n+1) guidance target intersection but for the later guidance target intersections. An example of this travel guidance is explained below with reference to FIG. 2.

(1) First, a regular guidance timing occurs a distance a0 short of a first guidance target intersection A when a vehicle reaches a vehicle position P1, and a vocal guidance such as that "Please turn right at the intersection A, and turn left at the next intersection B" is issued. When a road has two lanes, the driver can determine by this vocal guidance to enter a left side lane after passing through the first guidance target intersection A so as to turn left at the intersection B smoothly.

(2) A distance L1 between the first guidance target intersection A and the second guidance target intersection B is shorter than the distance a0 for generating the minimum regular guidance timing. Therefore, a guidance timing is complementally generated before passing through the second guidance target intersection B. In this example shown in FIG. 2, a distance L2 between the second guidance target intersection B and a third guidance target intersection C is also shorter than the distance a0. Therefore, at the specially generated guidance timing, vocal guidance is performed for the second and third guidance target intersections B and C in a manner such as that "Please turn left at the intersection B, and turn right at the next intersection C". The driver can confirm by this vocal guidance to turn left at the intersection B, and determine to enter a right side lane after passing through the intersection C so as to turn right at the intersection C smoothly.

(3) As described above, because the distance L2 is shorter than the distance a0, a supplementary guidance timing is generated again after passing through the second guidance target intersection B. In this case, regular guidance timing can be generated on the road ahead of the third guidance target intersection. Therefore, the vocal guidance at the supplementary guidance timing generated before passing through the third guidance target intersection C is sufficient only for the intersection C. The vocal guidance is performed in a manner such that "Please turn right at the intersection C".

Figure 3A:
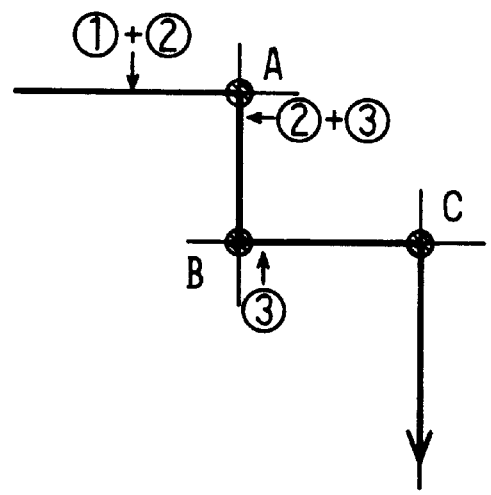
FIGS. 3A to 3C are schematic views showing various guidance timings with respect to three guidance target intersections.
Figure 3B:
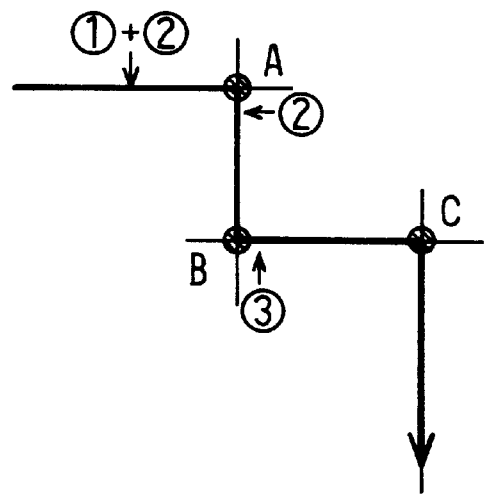
Figure 3C:
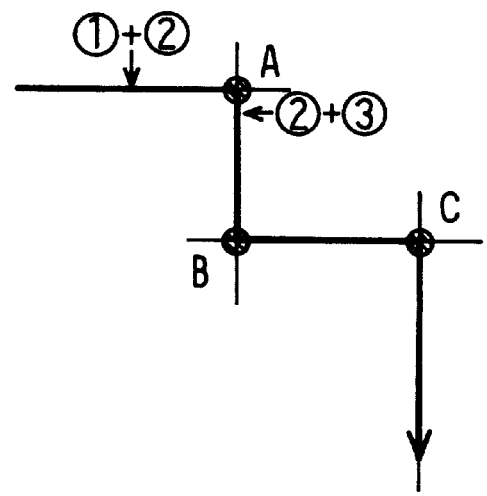

The example explained referring to FIG. 2 is timings and contents of guidance performed with respect to the three guidance target intersections. This example can be modified as shown in FIGS. 3B and 3C. FIG. 3A more schematically shows the example shown in FIG. 2. In FIG. 3A, each numeral ①, ②, or ③ indicates travel guidance for the first, second, or third guidance target intersections A, B, or C. At the first supplementary guidance timing, the travel guidance for the second and third guidance target intersections B and C ((①+②)) is issued immediately after passing through the first guidance target intersection A, and at the next supplementary guidance timing, the travel guidance only for the third guidance target intersection C (③) is performed immediately after passing through the intersection B.

In a modification shown in FIG. 3B, at a first supplementary guidance timing generated after passing through the first guidance target intersection A, travel guidance is performed only for the second guidance target intersection B. Further, at a second supplementary guidance timing generated after passing through the intersection B, travel guidance is performed only for the third guidance target intersection C. Thus, the travel guidance may be performed in sequence for an immediate guidance target intersection.

In another modification shown in FIG. 3C, at a supplementary guidance timing generated immediately after passing through the first guidance target intersection A, travel guidance is performed for the second and third guidance target intersections B and C. No travel guidance is performed after passing through the second guidance target intersection B.

Figure 4A:
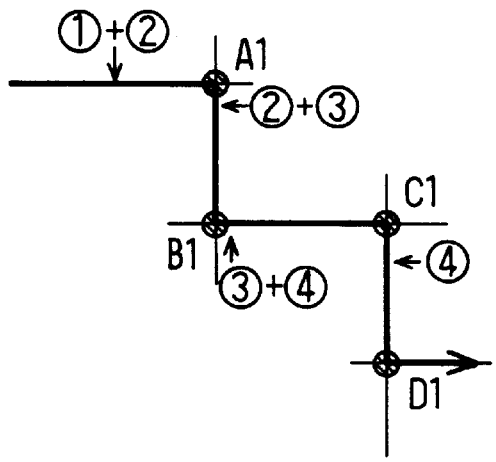
FIGS. 4A to 4D are schematic views showing various guidance timings with respect to four guidance target intersections.
Figure 4C:
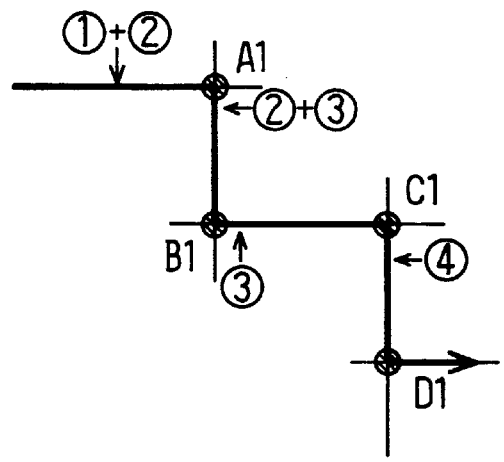
Figure 4B:
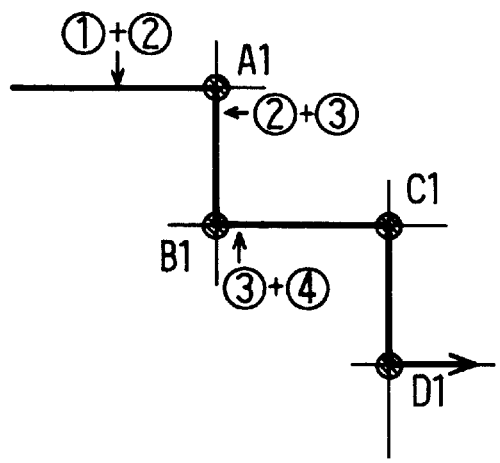

FIGS. 4A to 4C show variable guidance timings for four guidance target intersections A1 to D1. In an example shown in FIG. 4A, travel guidance is always performed for an immediate guidance target intersection. At a supplementary guidance timing generated after passing through a first guidance target intersection A1, travel guidance is performed for second and third guidance target intersections B1 and C1. At a supplementary guidance timing generated immediately after passing through the second guidance target intersection B1, travel guidance is performed for the third and fourth guidance target intersections C1 and D1. Then, at a supplementary guidance timing generated immediately after passing through the third guidance target intersection C1, travel guidance is performed only for the fourth guidance target intersection D1.

In another example shown in FIG. 4B, after passing through the third guidance target intersection C1, any travel guidance is not performed for the fourth guidance target intersection D1. This is because the travel guidance for the fourth guidance target intersection D1 is already performed passing through the third guidance target intersection C1. The other features are the same as those shown in FIG. 4A. In another example shown in FIG. 4C, at the supplementary guidance timing generated immediately after passing through the second guidance target intersection B1, travel guidance is performed only for the third guidance target intersection C1. Then, at the supplementary guidance timing generated immediately after passing through the third guidance target intersection C1, travel guidance is performed only for the forth guidance target intersection D1. The other features shown in FIG. 4C are the same as those shown in FIG. 4A.

Figure 4D:
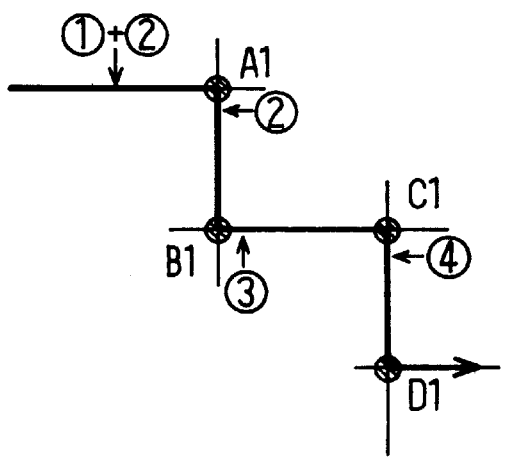

In still another example shown in FIG. 4D, at the supplementary guidance timing generated immediately after passing through the first guidance target intersection A1, travel guidance is performed only for the second guidance target intersection B1. At the supplementary guidance timing generated immediately after passing through the second guidance target intersection B1, travel guidance is performed only for the third guidance target intersection C1. Further, at the supplementary guidance timing generated immediately after passing through the third target intersection C1, travel guidance is performed only for the fourth guidance target intersection D1. Thus, the travel guidance is performed only for the immediate guidance target intersection.

Figure 5:
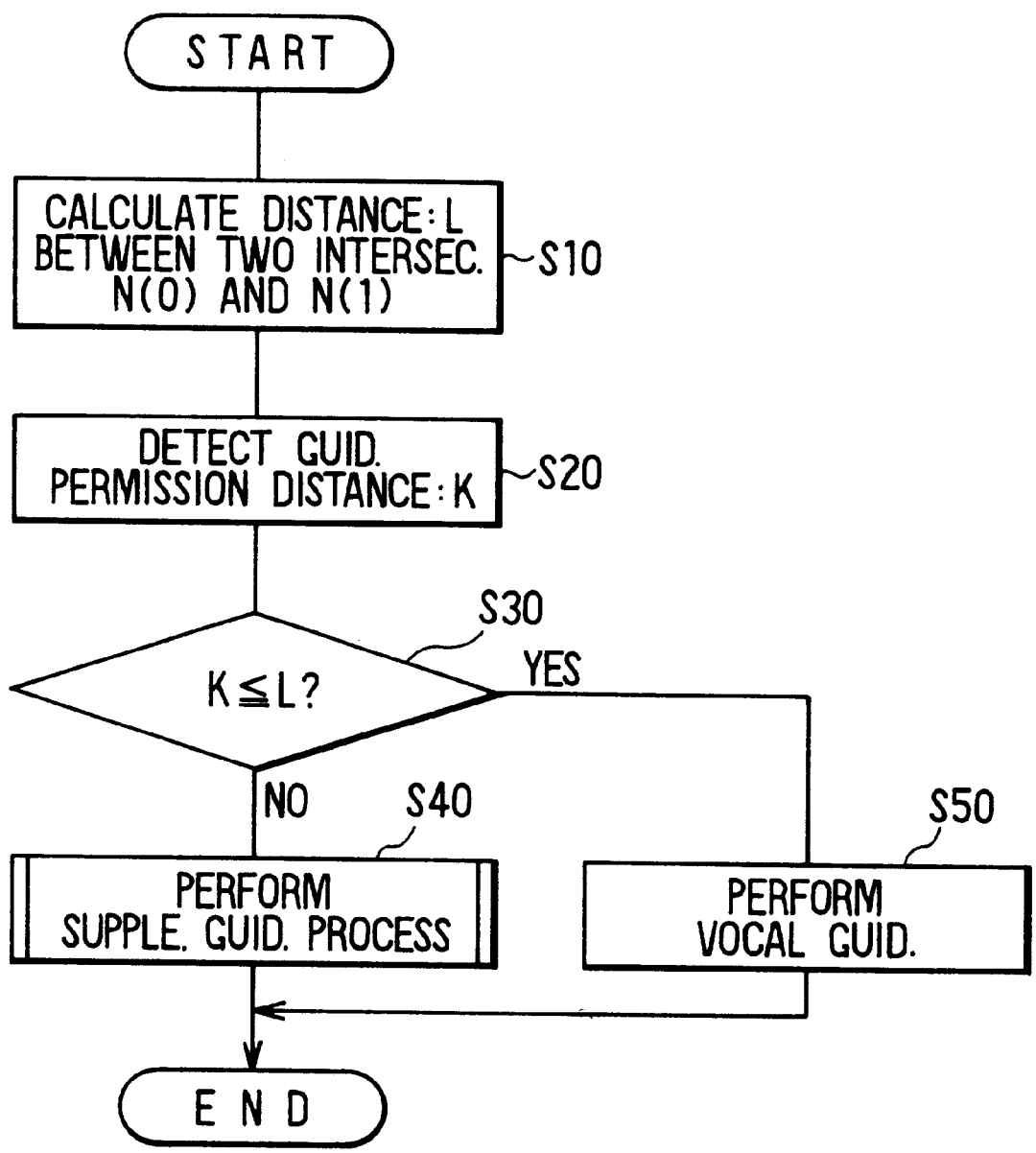
FIG. 5 is a flowchart showing a process performed every when a vehicle passes through a guide target intersection.
Figure 6:
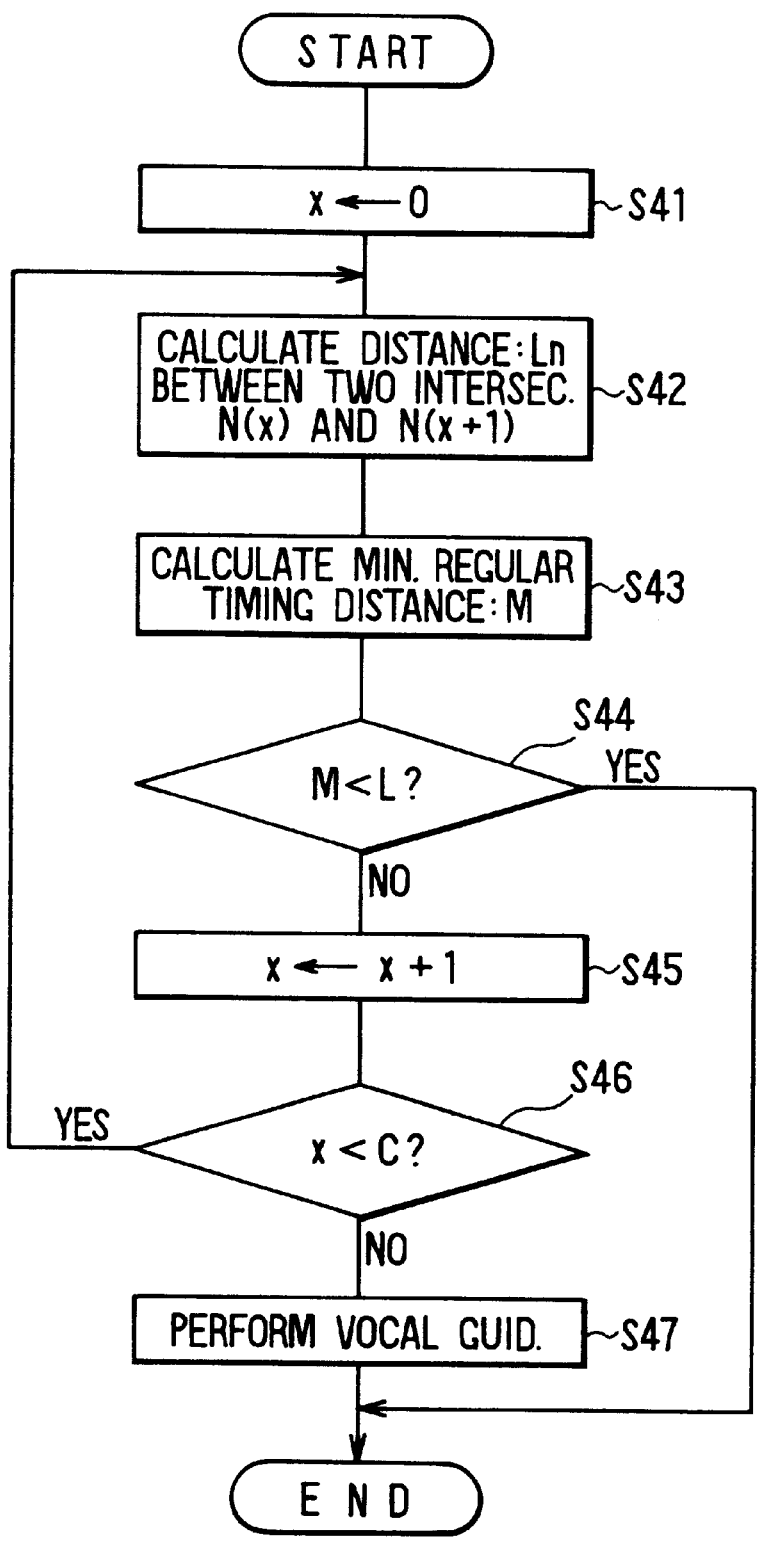
FIG. 6 is a flowchart showing a supplementary guidance process performed during the process shown in FIG. 5.
Figure 10:
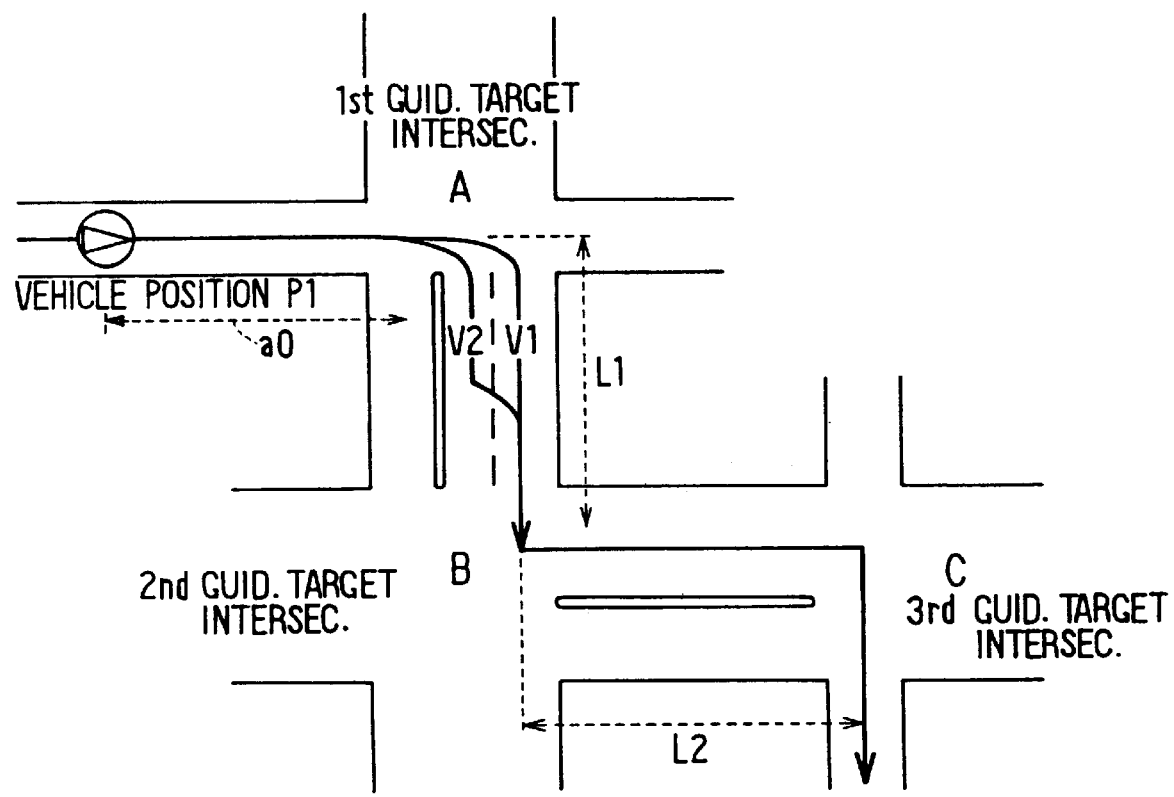
FIG. 10 is an explanatory view for explaining the conventional method and a problem thereof.

Next, a supplementary guidance process carried out by the electronic control unit 36 at the supplementary guidance timing is explained with reference to flowcharts shown in FIGS. 5 and 6. This process is started every when the vehicle passes through the guidance target intersection in a routine for performing the travel guidance at the regular guidance timings. The guidance process for performing the travel guidance at the regular guidance timing is not shown in a flowchart. Before explaining the supplementary guidance process referring to FIGS. 5 and 6, a manner for determining whether a vehicle passes through a guidance target intersection or not is explained referring to FIG. 8.

First, a link on which a vehicle is traveling is specified as a travel link based on the vehicle position information detected by the position detector 22 and the route information of links and nodes from the map date input device 24. When a travel link exists on a destination route, and a vehicle still travels on the destination route after the travel link is changed, it is determined that the vehicle passes through a node. When the node is a guidance target intersection, it is determined that the vehicle passes through the guidance target intersection. This is a passage determination.

For instance, in FIG. 8, when a vehicle passes through a node N0, the travel link is changed from a link R0 to a link R1. However, because the node N0 is not a guidance target intersection, the passage determination is not carried out. On the other hand, when a vehicle passes through a node N1 determined as a guidance target intersection and the travel link is changed from the link R1 to a link R2, the passage determination is carried out. If the passage determination is carried out, the control unit 36 executes the process shown in FIG. 5.

First, at step S10, a distance L between a previous guidance target intersection N(0) that the vehicle has passed through and a present (immediate) guidance target intersection N(1) is calculated. At step S20, a guidance permission distance K is detected in accordance with a type of approach road toward the present guidance target intersection. The guidance permission distance K is a distance (a0 in FIG. 2) set in accordance with the type of road for determining the regular guidance timing.

Then, at step 30, it is determined whether the distance L between the guidance target intersections is longer than the guidance permission distance K or not. If K>L (S30 : NO), a supplementary guidance process is executed at step S40. The supplementary guidance process is explained in detail later. If K≦L (S30 : YES), a regular guidance timing occurs, and vocal guidance such as that "Travel guidance will be issued ○○m short of the next intersection" is issued at step S50 for informing that the travel guidance will be issued at the regular guidance timing. After executing the step S40 or the step S50,this process is ended, and returns to the guidance process performed based on the regular guidance timing.

Successively, the supplementary guidance process performed at step S40 is explained with reference to FIG. 6. First, counter x is initialized (x=0) at step S41, and a distance Ln between a guidance target intersection N(x) and a guidance target intersection N(x+1) is calculated at step S42. As described above, N(0) is a previous guidance target intersection which a vehicle has passed through, N(1) is an immediate guidance target intersection, i.e., present guidance target intersection. N(2) is a guidance target intersection following the guidance target intersection N(1). N(3) and later are determined similarly.

Next, at step S43, a minimum regular timing distance M is calculated based on a type of approach road to the guidance target intersection N(x+1). At step S44, it is determined whether the distance Ln is larger than the minimum regular timing distance M. If K<L (S44 : YES), the supplementary guidance processing routines is ended. If K≧L (S44 : NO), at step S45, the counter x is increased (x←x+1), and at step S46, it is determined whether the counter x is larger than a specific condition number C. The condition number C indicates a number of links each defined between two guidance target intersections, conditions of which should be considered, to determine length conditions of the intersections. For instance, if C=1, only the link between the previous guidance target intersection N(0) and the present guidance target intersection N(1) is considered. If C=2, the following link between the present guidance target intersection N(1) and the next guidance target intersection N(2) is considered simultaneously.

If the counter x is smaller than the condition number C (S46 : YES), the control unit 36 repeats step 42 to step 46. If the counter x is equal to or larger than the condition number C (in practice, if the counter x is equal to the condition number C), travel guidance for the guidance target intersection is issued in vocal sounds at step 47. This vocal guidance may be only for the immediate guidance target intersection, or for two or more guidance target intersections including the immediate intersection. The number of intersections to be guided is selectively set. Incidentally, there is no relation between the number of intersections to be guided and the condition number C used at step S46. For instance, even when the distance is considered to a guidance target intersection beyond an immediate guidance target intersection, vocal guidance may be issued only for the immediate guidance target intersection at step S47.

Thus, the vehicle navigation system 20 of the present embodiment performs regular travel guidance at regular guidance timings which are generated specific distances short of an guidance target intersection. The vehicle navigation system 20 further performs supplementary travel guidance when a distance between two guidance target intersections is too short to generate a regular guidance timing. Accordingly, travel guidance can always be performed for an immediate guidance target intersection. The travel guidance may be performed for two or more guidance target intersections simultaneously when it is considered to be effective or a user can memorize the guidance.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A vehicle navigation system comprising:

first means for determining whether a first distance between first and second guidance target intersections is shorter than a specific distance for generating a regular guidance timing at which regular travel guidance is performed with respect to the second guidance target intersection when a vehicle travels between the first and second guidance target intersections; and second means for performing supplementary travel guidance at a supplementary guidance timing with respect to the second guidance target intersection after the vehicle passes through the first guidance target intersection and before the vehicle passes through the second guidance target intersection when the first distance is shorter than the specific distance.

2. The vehicle navigation system of claim 1, wherein:

the first means determines whether a second distance between the second guidance target intersection and a third guidance target intersection is shorter than the specific distance; and the second means performs the supplementary travel guidance with respect to the second and third guidance target intersections before the vehicle passes through the second guidance target intersection when the second distance is shorter than the specific distance.

3. The vehicle navigation system of claim 2, wherein the second means performs the supplementary travel guidance with respect to a plurality of guidance target intersections which follows the first guidance target intersection, before the vehicle passes through the second guidance target intersection, when each distance between two of the plurality of guidance target intersections is shorter than the specific distance.

4. The vehicle navigation system of claim 1, wherein the supplementary travel guidance is performed at the supplementary guidance timing immediately after the vehicle passes through the first guidance target intersection.

5. The vehicle navigation system of claim 1, wherein the regular guidance timing is set in accordance with a type of road on which the vehicle travels.

6. The vehicle navigation system of claim 1, wherein the travel guidance is performed in vocal sounds.

7. The vehicle navigation system of claim 1, further comprising a display device which displays information for performing the travel guidance in cooperation with the second means.

8. The vehicle navigation system of claim 1, further comprising third means for determining a determination route from a present position of the vehicle to a destination, wherein:

the first and second guide target intersections exists on the determination route.

9. The vehicle navigation system of claim 1, further comprising:

traveling route determining means for determining a traveling route which the vehicle uses in order to reach a destination;

wherein the first and second guidance target intersections are transit points of the vehicle on the traveling route, and are the intersections where the vehicle turns.

10. The vehicle navigation system of claim 1 wherein the specific distance is a minimum distance for generating the regular travel guidance.

11. The vehicle navigation system of claim 1, wherein the first and second guidance target intersections are transit points of the vehicle on a traveling route determined by the vehicle navigation system.

12. A vehicle navigation system comprising:

traveling route determining means for determining a traveling route which a vehicle uses in order to reach a destination;

judging means for judging whether a first distance between first and second guidance target intersections is shorter than a specific distance for generating regular travel guidance when a vehicle travels toward the destination; and guidance means for performing a travel guidance based on the traveling route;

wherein, when the first distance is shorter than the specific distance, the guidance means performs a first guidance for the first guidance target intersection and a second guidance for the second guidance target intersection simultaneously before the vehicle reaches to the first guidance target intersection, and performs supplementary guidance for the second guidance target intersection after the vehicle passes through the first guidance target intersection.

13. The vehicle navigation system of claim 12, wherein:

the judging means judges whether a second distance between the second guidance target intersection and a third guidance target intersection is shorter than the specific distance; and the guidance means performs the supplementary guidance for the second and third guidance target intersections before the vehicle passes through the second guide target intersection when the second distance is shorter than the specific distance.

14. The vehicle navigation system of claim 12, wherein the guidance means performs the supplementary guidance for a plurality of guidance target intersections which follow the first guidance target intersection before the vehicle passes through the second guidance target intersection when each distance between two of the plurality of guidance target intersections is shorter than the specific distance.

15. The vehicle navigation system of claim 12, wherein the specific distance is a minimum distance to generate the regular travel guidance.

16. The vehicle navigation system of claim 12, wherein the first and second guidance target intersections are transit points of the vehicle on the traveling route, and are the intersections where the vehicle turns.

17. A vehicle navigation system electronic control unit for determining a vehicle travel route to a desired destination, for determining whether a first distance between first and second guidance target nodes is shorter than a specific distance to provide regular vehicle travel guidance toward the destination, and for generating travel guidance instructions based on the vehicle travel route, the electronic control unit for simultaneously generating first guidance instructions for the first guidance target node and second guidance instructions for the second guidance target node before the vehicle reaches the first guidance target node when the first distance is shorter than the specific distance, and for performing supplementary guidance for the second guidance target node after the vehicle passes through the first guidance target node.

18. The vehicle navigation system electronic control unit of claim 17, wherein said supplementary guidance is given for a plurality of nodes which follow said first node before the vehicle passes through said second node when each distance between two of the plurality of nodes is shorter than said specific distance.

19. The navigation system of claim 18, wherein said nodes are particular intersections on the vehicle travel route, and said travel route is an optimal travel route calculated using Dijakstra's algorithm.

20. The navigation system of claim 17 further comprising a remote controller sensor that receives signals from a remote controller having various switches through which a user inputs various instructions to the navigation system.

* * * * *

UNITED STATES PATENT AND TRADEMARK OFFICE
CERTIFICATE OF CORRECTION

PATENT NO. : 6,278,943 B1
DATED : August 21, 2001
INVENTOR(S) : Hideakl Yamauchl It is certified that error appears in the above-identified patent and that said Letters Patent is hereby corrected as shown below:

Title page,
Item [54], Title, change "VEHICLE SYSTEM FOR TRAVEL GUIDANCE OF INTERSECTIONS" to read -- VEHICLE NAVIGATION SYSTEM FOR TRAVEL GUIDANCE OF INTERSECTIONS --.

Signed and Sealed this

Eleventh Day of April, 2006

JON W. DUDAS
*Director of the United States Patent and Trademark Office*